(12) United States Patent
Stagg et al.

(10) Patent No.: US 7,789,628 B2
(45) Date of Patent: Sep. 7, 2010

(54) PLASTIC FANS HAVING IMPROVED FAN RING WELD LINE STRENGTH

(75) Inventors: Jonathan B. Stagg, Bellevue, MI (US); Donald E. Buckley, Lansing, MI (US)

(73) Assignee: BorgWarner Inc., Auburn Hills, MI (US)

( * ) Notice: Subject to any disclaimer, the term of this patent is extended or adjusted under 35 U.S.C. 154(b) by 922 days.

(21) Appl. No.: 11/617,696

(22) Filed: Dec. 28, 2006

(65) Prior Publication Data

US 2007/0104581 A1 May 10, 2007

Related U.S. Application Data

(63) Continuation-in-part of application No. 10/831,789, filed on Apr. 26, 2004, now Pat. No. 7,168,922.

(51) Int. Cl.
*F04D 19/00* (2006.01)

(52) U.S. Cl. .................. 416/169 A; 416/189; 416/195; 415/915

(58) Field of Classification Search .................. 416/189, 416/203, 227, 228, 169 A, 195; 29/889.3; 415/915

See application file for complete search history.

(56) References Cited

U.S. PATENT DOCUMENTS

| | | | | |
|---|---|---|---|---|
| 3,201,857 A | * | 8/1965 | Klonoski | 29/889.3 |
| 5,405,243 A | * | 4/1995 | Hurley et al. | 416/189 |
| 5,948,340 A | * | 9/1999 | Terada et al. | 264/328.8 |
| 6,596,370 B2 | * | 7/2003 | Hyuga et al. | 428/66.6 |

FOREIGN PATENT DOCUMENTS

JP  2003094494 A  *  4/2003

OTHER PUBLICATIONS

English Machine Translation of JP 2003-94494 A from JPO website.*

* cited by examiner

*Primary Examiner*—Richard Edgar

(57) ABSTRACT

Injection molded ring fan embodiments and methods for making them. The methods influence material flow during the injection molding process such that a major portion of the materials flowing in opposite directions in the outer rings preferably flow past one another, intermix in a swirling relationship, and/or collide at an angle relative to one another. This results in better material mixing or integration of the flow fronts. In one embodiment, the thickness of the outer ring varies in different portions between adjacent fan blades.

9 Claims, 4 Drawing Sheets

PLASTIC FANS HAVING IMPROVED FAN RING WELD LINE STRENGTH

CROSS-REFERENCE TO RELATED APPLICATIONS

This is a continuation-in-part of U.S. application Ser. No. 10/831,789 filed on Apr. 26, 2004.

TECHNICAL FIELD

The invention relates generally to fan drive systems and more specifically to plastic fans having improved fan ring weld line strength.

BACKGROUND ART

The present invention concerns cooling fans, such as fans driven by and for use in cooling an industrial or automotive engine. More particularly, certain aspects of the invention relate to a ring fan, while other features concern fan blade design.

In most industrial and automotive engine applications, an engine-driven cooling fan is utilized to draw air through a coolant radiator. Usually, the fan is driven through a belt-drive mechanism connected to the engine crankshaft.

A typical cooling fan includes a plurality of blades mounted to a central hub plate. The hub plate can be configured to provide a rotary connection to the belt drive mechanism, for example. The size and number of fan blades is determined by the cooling requirements for the particular application. For instance, a small automotive fan may only require four blades having a diameter of only 9". In larger applications, a greater number of blades is required. In one typical heavy-duty automotive application, nine blades are included in the fan design, the blades having an outer diameter of 704 mm.

In addition to the number and diameter of blades, the cooling capacity of a particular fan is also governed by the airflow volume that can be generated by the fan at its operating speed. This airflow volume is dependent upon the particular blade geometry, such as the blade area and curvature or profile, and the rotational speed of the fan.

As the cooling fan dimensions and airflow capacity increase, the loads experienced by the fan, and particularly the blades, also increase. In addition, higher rotational speeds and increased airflow through the fan can lead to de-pitching of the blades and significant noise problems. In order to address these problems to some degree, certain cooling fan designs incorporate a ring around the circumference of the fan. Specifically, the blade tips are attached to the ring, which provides stability to the blade tips. The ring also helps reduce vortex shedding at the blade tip, particularly when the ring is combined with a U-shaped shroud that follows the circumference of the ring.

The ring fan design, therefore, eliminates some of the structural difficulties encountered with prior unsupported cooling fan configurations. However, with the increased strength and improved vibration characteristics provided by the ring fan, the nominal operating conditions for these fans have been increased to again push the envelope of the ring fan's capability. Moreover, the mass inertia of the circumferential ring increases the centripetal force exerted on the blade-ring interface. Thus, similar to prior cooling fan designs, there is a limit to the amount of force that can be exerted on the ring fans before they fail. For plastic or fiber reinforced plastic molded ring fans, which are formed by injection molding, failure typically due to stress occurs along weld lines or knit lines, which are formed wherein two opposing flow fronts of molten polymeric material collide "head-on" substantially at an 180 degree angle relative to each other during the molding process.

Consequently, a need has again developed for ways to improve cooling airflow capacity of ring fans, while at the same time increasing their strength. This need becomes particularly acute as the operational rotational speeds of the fan increase to meet the increasing cooling demands for large industrial and automotive engines.

SUMMARY OF THE INVENTION

The present invention relates to a method for increasing the strength of polymeric or fiber reinforced polymer ring type fans, particularly fans formed using an injection molding process.

The intent of the present invention is to move the location of the weld or knit line to a less stressed location or orientation along newly created meld lines, as opposed to knit lines. The meld lines are formed wherein opposing flow fronts of molten material meet and collide against each other at angles other than 180 degrees relative to each other—i.e. not "head on" with each other. Preferably, the flow fronts will slide partially past each other, and/or will mix in a swirling manner. The intent is also to improve the glass fiber reinforcement along the meld line. The present invention proposes several embodiments for achieving this result.

In one embodiment, portions of the fan ring between two adjacent fan blades, and possibly positioned near the site of the former weld line, are thickened, thus allowing the molten raw material to flow past, or swirl, in the area to form a meld line having a minimized amount of material directly colliding at this location. In one of these embodiments, the fan ring between two adjacent fan blades is larger in cross sectional area adjacent one of the blades than the other, and the larger and smaller areas intersect in a multi-angled manner to facilitate the two flows to pass at least partially along the side of one another and create a mixing or swirling type interaction.

In another embodiment, one or more spillover-type reservoirs are added during molding to the outer fan ring between adjacent fan blades, possibly at locations near the meld line, in order to influence the flow of the material and prevent a direct collision or the formation of an 180° knit line. The reservoirs form appendages on the molded fans and also may purge out and remove impurities from the melt. These impurities include, but not limited to, trapped air, evolved gases, fine debris, and mold release agents, which tend to gather at the flow fronts. These impurities could affect polymeric adhesion and adhesion strength of the glass fiber/resin interfaces. The appendages, which can be on either the inside or outside surfaces of the fan ring, are removed prior to assembly of the fan as part of a vehicle cooling system.

The present invention itself, together with attendant advantages, will be best understood by reference to the following detailed description, taken in conjunction with the accompanying figures.

BEST MODE(S) FOR CARRYING OUT THE INVENTION

Figure 1:
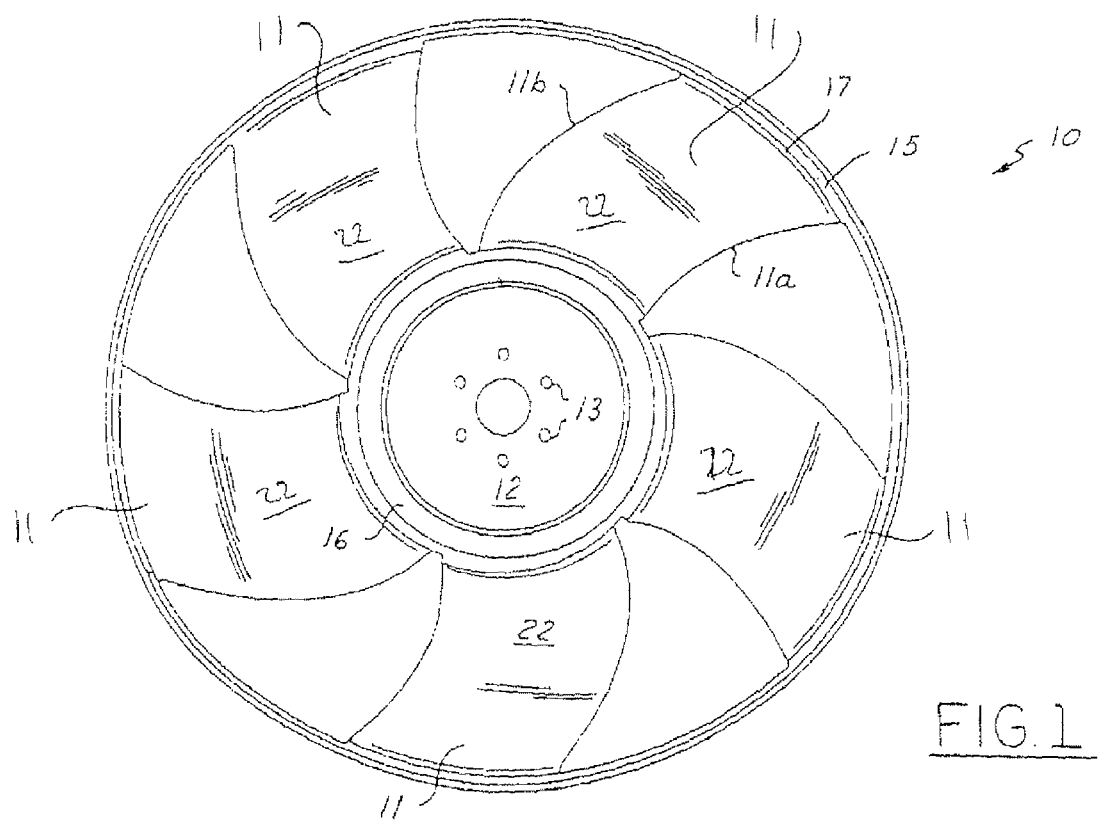
FIG. 1 illustrates a ring fan according to the prior art.

For the purposes of promoting an understanding of the principles of the invention, reference will now be made to the embodiments illustrated in the drawings and specific language will be used to describe the same. It will nevertheless be understood that no limitation of the scope of the invention is thereby intended. The inventions include any alterations and further modifications in the illustrated devices and described methods and further applications of the principles of the invention which would normally occur to one skilled in the art to which the invention relates.

Figure 2:
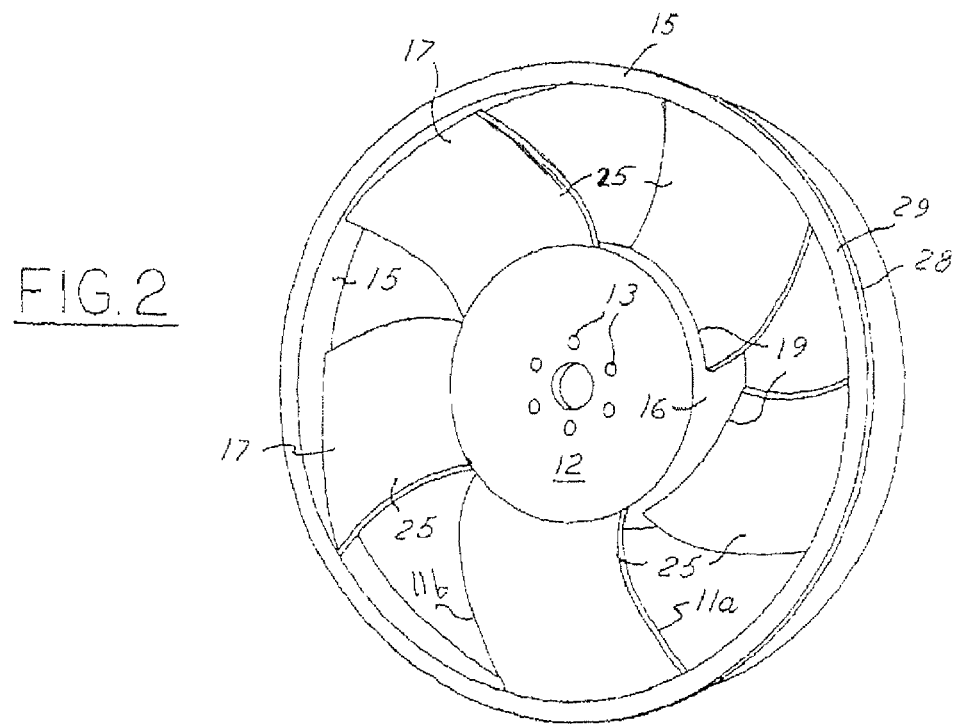
FIG. 2 is a rear perspective view of the ring fan as depicted in FIG. 1.

Referring now to FIGS. 1 and 2, a typical ring fan 10 according to the prior art includes a number of blades 11 mounted to a central hub plate 12. As shown in FIG. 1, the hub plate 12 can include a mounting bolt ring 13 configured to mount the fan to a fan drive assembly of known design. The fan 10 further includes an outer ring 15 fixed to the blade tips 17 of each of the fan blades 11 and an inner ring 16 fixed to the root 19 of each of the blades 11. The inner ring 16, outer ring 15 and blades 11 are preferably formed of a high strength moldable polymer material that is preferably injection molded about the metallic hub plate 12 in a conventional known process. Typical plastics used include polyamides (such as Nylon 6 and nylons under the trade name Zytel® Nytel) or polypropylenes. These plastics are typically reinforced with between about 15 and 50%, and more preferably 15 and 30%, fiber reinforcement. The fiber reinforcement is typically in the form of short glass fibers, although long glass fibers may also be used.

Each of the blades 11 includes a front face 22 that is at the effective inlet to the ring fan 10. Likewise, each blade includes an opposite rear face 25 (see FIG. 2) on the backside of the ring fan. In the preferred embodiment, five blades 11 can be provided, each having a substantially uniform thickness from the blade root 19 to the blade tip 17. In an alternative embodiment, each of the blades 11 can vary in thickness from the leading edge 11a to the trailing edge 11b of the blade. Each blade 11 preferably follows an air foil-type configuration adapted to provide maximum airflow when the ring fan 10 is operated within its standard rotational speed operational range and within its intended range of system restriction.

In referring to FIG. 2, it can be seen that the outer ring 15 of the fan 10 includes a flared rim 28, disposed generally at the output face of the fan. The flared rim 28 defines a radially outwardly flared surface 29 that follows a gradual curvature away from the tips 17 of each of the blades 11. The fan 10 defines an inlet side at the leading edges 11a of the fan blades, and an opposite outlet side at the trailing edges 11b. The flared rim 28 of the outer ring 15 is disposed at the outlet side of the fan 10.

Although a fan with five blades and a uniform curve along the lengths of the blades is shown in the drawings, the number of blades and precise curvature of the blades is not part of the present invention. A molded plastic fan in accordance with the present invention can have any number of blades with any cross-sectional shape and any structural curvature along the lengths of the blades. Also, although a fan with a flared rim is shown in the drawings, it is not necessary for the fan to have a flared rim in accordance with the present invention.

Figure 3:
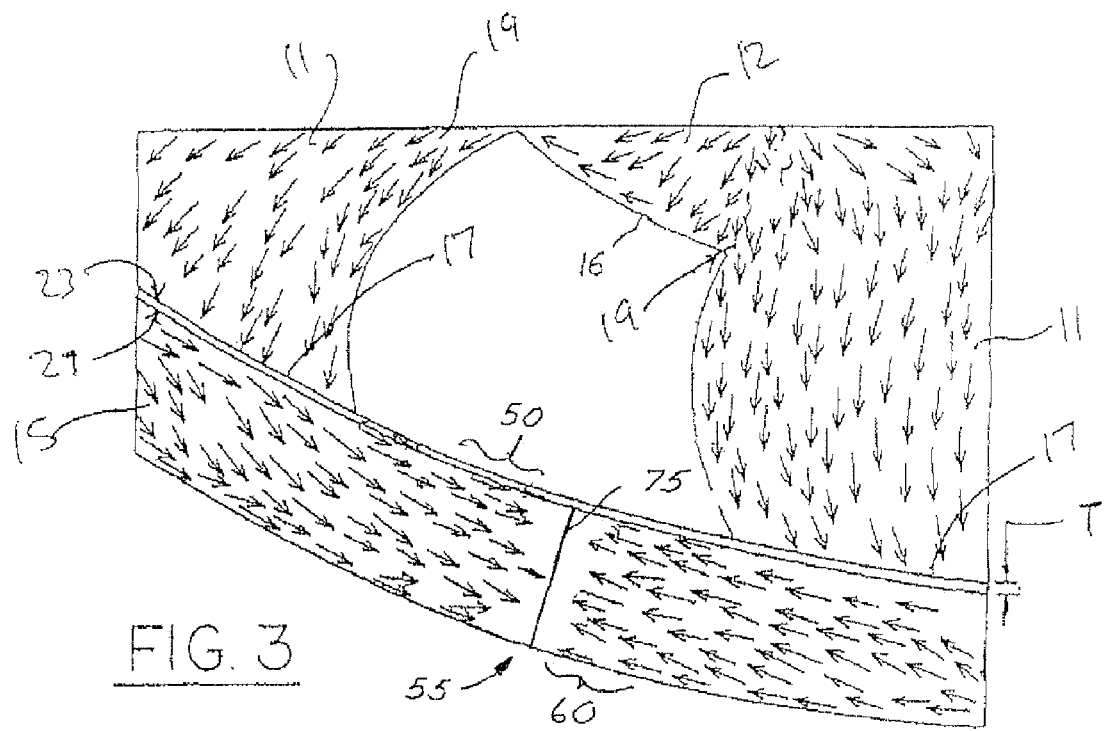
FIG. 3 is a schematic illustration showing molten raw material flow through the outer ring of FIG. 1 during molding conditions.

FIG. 3 shows a close-up and enhanced view of the outer ring 15 of the ring fan 10 according to the prior art that illustrates the flow fronts 50, 60 of melted (i.e. molten) plastic material used to form the outer ring 15 in a conventional plastic injection molding process. In such a process, a mold typically formed of two halves is positioned in an injection molding machine. A cavity in the shape of the final molded part is formed in the mold. After the mold is closed, molten plastic material is injected through gates (a/k/a orifices) into the mold cavity.

For the molding of fans, the plastic material is typically injected through gates positioned at the hub ring 16. A gate is positioned at the root 19 of each of the blades 11. The injected plastic material flows simultaneously radially outwardly through all of the blade portions of the mold cavity. At the outer ring, the plastic flows from each blade separately and flows along the ring portions of the mold cavity in both directions.

For plastic fans 10 formed from the polyamides as described above, the molten polyamide (i.e. the raw material) is injected through the gates at between about 218 and 226 degrees Celsius (424 to 439 degrees Fahrenheit) in presses with capacities between about 500 tons and 1,500 tons of pressure. The gates contained within the mold generally range for about 1 to 4 mm in diameter (0.039 inches to about 0.157 inches).

Once the mold cavity is completely filled with plastic material, the mold is typically packed with more plastic to compensate for any shrinkage as the plastic cools. Once the plastic has cooled and hardened sufficiently, the mold is opened and the molded fan 10 removed.

As the raw material is injected within the mold cavity, the molten raw material flows along a path of least resistance (as shown by the arrows in FIG. 3). One portion of the raw material thus forms the hub ring 16. As indicated, a portion of the molten raw plastic material also flows from the respective gates through the blades 11 from root 19 to tip 17, and into the outer ring cavity to form the outer ring 15. The flow fronts 50, 60 travel within the outer ring 15 from two adjacent blade tips towards a middle area approximately equidistant from the tips of each blade. The two flow fronts 50, 60 typically meet and collide directly "head on" into one another along a fairly planar region 55 that is nearly perpendicular to the inner circumference 23 and outer circumference 27 of the outer ring 15. The planar region 55 runs perpendicular to a tangent of the inner circumference 23 and outer circumference 27 of the outer ring 15 within this middle area. The thickness "T" of the outer ring 15 is constant along the length and width of the ring. The meeting and freezing of flow fronts 50, 60 create knit lines 75 in the outer ring 15 between each respective adjacent pair of blades 11. As is known to persons of ordinary skill in the art, knit lines 75 typically represent the weakest part of the outer ring 15 relative to centrifugally induced bending stresses.

While part geometry can affect the shape of the knit line 75, generally kit lines are quite linear and run axially along the outer ring 15 roughly midway between adjacent blade tips 17 and perpendicular to the tangent defining both the inner circumference 23 and outer circumference 27 of the outer ring 15.

There are many reasons why the knit line 75 represents the weakest part of the outer ring 15. Knit lines 75 contain trapped air and evolved gases that can affect the strength of the outer ring 15 by creating voids in the structure. Moreover, mold release agents, fine debris and/or other impurities contained in the molten materials introduced in the molding process tend to gather along the knit lines 75, resulting in a discontinuity of the formed matrix structure that can weaken the structure. These same materials affect both polymeric adhesion and adhesion between the polymeric materials and the glass fiber reinforcement material, which may additionally decrease strength in the knit line 75. Further, the collision on the flow fronts does not allow the fibers contained in glass fiber thermoplastic materials to mingle easily, therefore adversely affecting the reinforcement along the knit lines 75.

Figure 4:
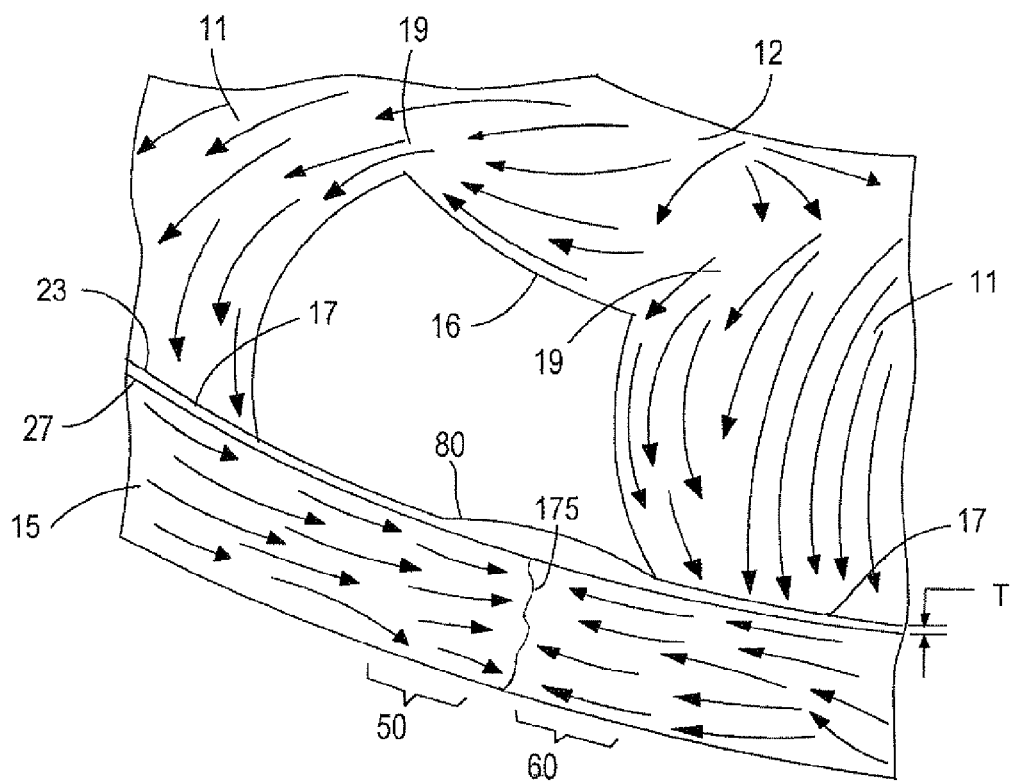
FIG. 4 is a schematic illustration showing molten raw material flow through the outer ring during molding conditions of a ring fan according to one embodiment of the present invention.

FIG. 4 illustrates one embodiment for improving the strength of the ling fan 10 at these various weld lines. In FIG. 4, the raw plastic material flow fonts 50, 60 are redirected by varying the thickness of the outer ring 15 along portions 80 between the blades. In one embodiment, the thickness is formed of a bulge on the inner surface 23 of the outer ring. This bulge can have a uniform and continuous increase in thickness from one blade tip to another forming an enlarged bump or protrusion approximately equidistant between adjacent blades. The bulge alternatively could be formed essentially as a "speed bump" approximately in the middle between two adjacent blades. Other sizes and shapes of the bulge could be provided in accordance with the invention. It is believed that the advance of the flow fronts 50 and 60 into the bulge areas will form a non-linear meld line 175 which will improve the strength of the meld line and thus the molded fan product.

Figure 5:
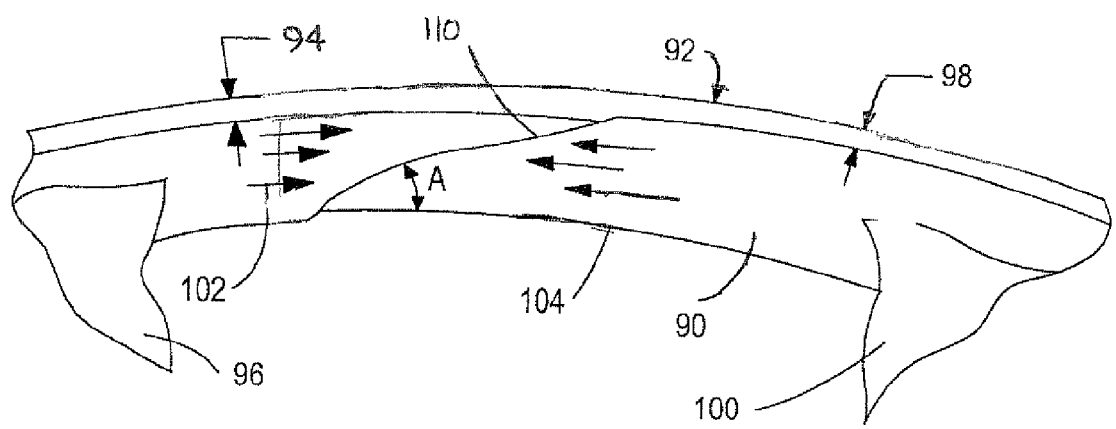
FIG. 5 is a schematic illustration showing an embodiment for improving the strength of a meld line in accordance with the present invention.

Another embodiment of the invention is shown in FIG. 5 which is a view of the inside surface 90 of a fan ring 92. A ring of consistent thickness around the fan perimeter is changed so that the cross-sectional size and area of one portion 94 of the ring 92 next to or near one fan blade 96 is greater (or thicker) than the cross-sectional size and area of the portion 98 of the ring next to or near adjacent blade 100. This same structure is duplicated between each pair of blades around the circumference of the fan ring to keep the mass of the fan assembly evenly balanced. Thus, as the molten injected plastic flows radially outward along the blades and divides into two flows at each blade tip, the plastic portion flowing, in one direction enters an area greater in size and volume than the plastic portion flowing in the opposite direction. Each flow will seek the path of least resistance (larger volume) and thereby initiates a flow-by pattern with the opposing oncoming flow from the adjacent blade in the area between the blades.

The ratio of the increase in thickness of portions 94 relative to the rest of the fan ring preferably ranges from about 1.25:1 to 2:1. The increase in thickness and the ratio of the increase can be altered by persons of ordinary skill in the art if necessary to secure the strongest meld line.

With the embodiment shown in FIG. 5, the two opposing flow fronts 102 and 104 also meet at an angle to one another and at least a portion of each of the flow fronts preferably will slip or pass along the side of the other. The material at the leading edges of the flow fronts will also rotate or swirl relative to one another and allow the two flow fronts to intermix and merge together. Rather than meeting and freezing along a planar region 55 as shown in FIG. 3, or a non-linear meld line 175 as shown in FIG. 4, the two flow fronts of the FIG. 5 embodiment will provide a more staggered and jagged meld line.

As indicated with the embodiment shown in FIG. 5, thickened ring portions 94 between each pair of blades cause at least a portion of the two flow fronts 102 and 104 to meet along an angle A relative to each other at the newly formed meld line 110. Angle A preferably is 30°-60°, but can be any acceptable angle that causes the two flow fronts to significantly intermix. The meld line 110 can be linear or curved and, if curved can have a convex, concave, or arbitrary shape.

In an alternative embodiment, the thickness of the portions of the fan ring between adjacent fan blades can be changed in another manner. The thickness of one portion of the fan ring, such as portion 94 as shown in FIG. 5, can be enlarged in a direction facing the viewer looking at FIG. 5, i.e. radially inwardly from the fan ring. In addition, the thickness of another portion of the fan blade near or next to the adjacent fan blade, such as portion 98 as shown in FIG. 5, can be enlarged in a direction away from the viewer, i.e. radially outwardly from the fan ring. This structure would assist in insuring that portions of the material flows from each fan blade would slip or pass along the sides of one another and create intermixing of the two flow fronts. Again, this same structure should be duplicated around the perimeter of the fan ring to keep the fan evenly balanced.

Figure 6:
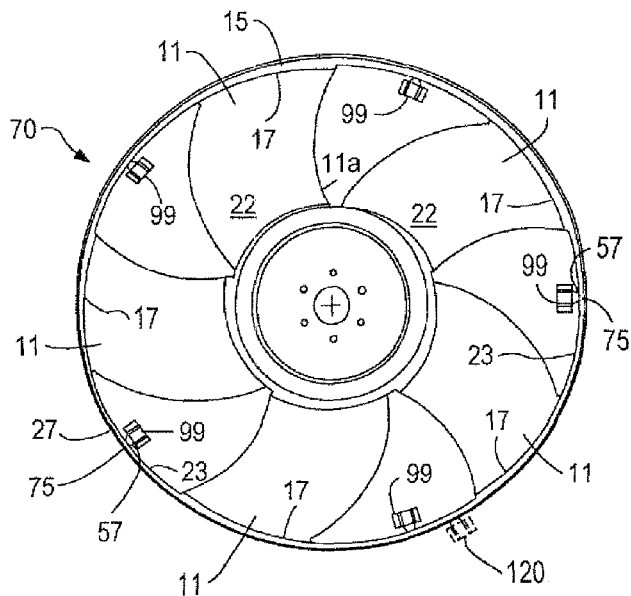
FIG. 6 illustrates a ring fan having a plurality of removable appendages according to another embodiment of the present invention.

FIG. 6 illustrates another method for improving the strength of the outer ring 15 of a ring fan 70. A plurality of spillover-type appendages 99 are formed during the plastic injection molding process. The appendages are formed on the outer ring 15 between each pair of adjacent blades 11. In FIG. 6, the appendages 99 are shown coupled along the inner surface or circumference 23 of the outer ring 15. The material from the flow fronts firm each blade tip 17 (as in FIG. 3) will flow into the spillover appendages 99 as opposed to meeting and freezing along a planar region such as region 55 shown in FIG. 3. In this way, newly formed meld lines are minimized (removed or reduced) in the outer ring 15, and instead can be formed in the appendages 99. After the flow material cools and the molded fan is removed from the mold, the appendages 99 are easily removed) such as by twisting or cutting them off.

The use of spillover appendages 99 also helps purge out trapped gas within the mold. The appendages provide a location in which mold release residue and other impurities, such as oxidized residue or debris, may be collected during the molding process. The removal of these impurities acts to improve both polymeric adhesion and adhesion between the polymeric materials and the glass fiber reinforcement material, located within the outer ring.

While the appendages 99 are shown in FIG. 6 as being located centrally between adjacent fan blades along the inner circumference 23 of the outer ring 15, alternative embodiments can be utilized. It is possible to locate the appendages 99 at arbitrary locations between adjacent pairs of blades to form new meld lines at different positions. It is also possible to provide two or more spillover appendages between each pair of fan blades.

The appendages further can be formed along the outer circumference 27 of the outer ring, such as represented by appendage 120 shown in dashed lines. In other embodiments, one appendage can be formed on the inner circumference 23 and another appendage formed on the outer circumference 27, and each of the appendages can be located arbitrarily between each adjacent pair of blade tips 17. It also may be possible that the number of appendages formed between one adjacent pair of blade tips 17 can be different from the number of appendages formed between another adjacent pair of blade tips 17, but, if so, the appendages must all be removed cleanly and evenly or the fan may be left unbalanced.

Figure 7:
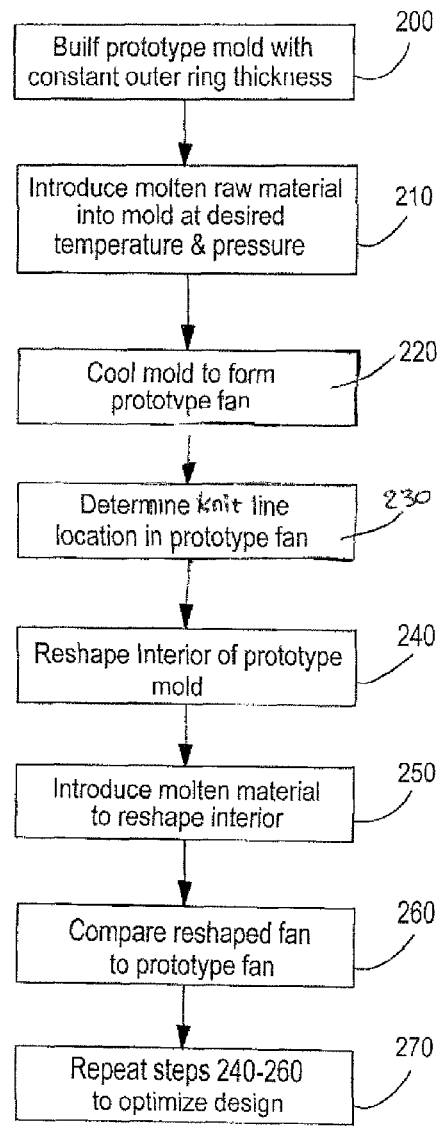
FIG. 7 is a flow diagram depicting a method in accordance with the present invention.

In the embodiments as described above relative to FIGS. 4-6, a methodology for improving outer ring strength of a fan used in a fan drive system may be accomplished according to the flow diagram as shown in FIG. 7. First, in step 200, a prototype mold is built for the fan having an interior corresponding to the size and shape of the desired ring fan. In this prototype mold, the thickness of the outer ring is held constant. Next, in step 210, a quantity of a molten raw material is introduced simultaneously through each of the plurality of gates and within said interior at a desired temperature and pressure. In step 220, the raw material is cooled within the prototype mold to form a prototype fan.

In Step 230, the location of the knit line along the outer ring between each adjacent pair of the plurality of fan blades is determined. As described above, the knit line corresponds to the weakest portion of the outer ring of a ring fan between adjacent fan blades and is formed at a position wherein a first flow front of a portion of said quantity of molten plastic material collides with a second flow front of a second portion of said quantity of molten plastic material. In a uniform thickness outer ring (i.e. uniform cross-sectional size and shape), under ideal molding conditions, the flow fronts collide directly into to each other forming a linear knit line of the type shown in FIG. 3.

Next, in Step 240, the interior of said prototype mold is reshaped such that the molding process forms a ring fan in which a portion of the molten plastic material flow of one flow front collides with a portion of the molten plastic material from a second flow front in a different manner. In FIG. 4, this step is accomplished by increasing the thickness of the outer ring 15 along portions of its length and width as desired, such as at region 80. In FIG. 5, this step is accomplished by increasing the thickness of the outer ring 92 along portions of its length and width as desired, such as at the regions 94. In FIG. 6, this step is accomplished by providing one or more spillover appendages along the outer ring 15. In still another embodiment, the thickness of the outer ring could be changed as indicated above and spillover appendages along the outer ring could also be provided.

In Step 250, a quantity of a molten plastic material is introduced simultaneously through each of the plurality of gates and within said interior of the reshaped prototype at a desired temperature and pressure.

In Step 260, the strength of the reshaped prototype fan is compared with the strength of the prototype fan having a constant thickness throughout the outer ring.

Finally, if necessary, in Step 270, the prototype tool is reshaped and Steps 240-200 repeated in order to achieve an optimum desired strength of the outer ring.

While knit line 75 is shown formed on the outer ring 15 of the ring fan shown in FIG. 3, it is recognized that additional knit lines (not shown) may be formed in other areas of the ring fan where flow fronts intersect. For example, molten plastic material flow also intersects within the inner ring 16 between the gates as raw materials are injected simultaneously through the gates. Thus, the methods for improving ring fan strength may be incorporated into other portions of the ring fall. For example, similar methods could be used to increase the strength of the hub ring 16. The thickness of the inner ring could be changed uniformly around the perimeter of the hub ring, and/or spillover appendages could be provided.

The present invention thus describes unique strategies for improving the strength of molded ring falls. The additional fan ring strength provided by the present invention becomes particularly acute as the operational rotational speeds of the fan increase to meet the increasing cooling demands for large industrial and automotive engines.

Further, the embodiments and methods described herein are equally applicable for the formation of any moldable plastic part in which molten raw material flow intersects during the molding process.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A molded plastic ring fan comprising:
   a central hub member;
   a plurality of blade members molded to said hub member and extending radially outward therefrom; and
   an outer ring member molded to the outer ends of said blade member;
   said outer ring member having ring sections extending between pairs of said outer ends of said blade members;
   each of said ring sections having a first thickness adjacent a first one of said pairs of outer ends of said blade members, and having a second thickness adjacent the second of said pairs of outer ends of said blade member;
   said first thickness being greater than said second thickness;
   wherein when said ring fan is molded, the flow fronts of the plastic material in each ring section intermix with one another.

2. The molded plastic ring fan as described in claim 1 wherein said first thickness is 1.25 to 2 times the thickness of said second thickness.

3. The molded plastic ring fan as described in claim 1 wherein the first and second thickness portions intersect on said ring section at an angle to one another.

4. The molded plastic ring fan as described in claim 3 wherein said angle is about 30-60°.

5. The molded plastic ring fan as described in claim 1 wherein said plastic is a high strength moldable polymer material.

6. The molded plastic ring fan as described in claim 1 wherein said plastic comprises a polyamide or a polypropylene.

7. The molded plastic ring fan as described in claim 1 wherein said plastic is a fiber reinforced polymer material.

8. The molded plastic ring fan as described in claim 1 wherein said intermixing of said flow fronts of plastic material comprises the flow fronts slipping past each other and swirling.

9. The molded plastic ring fan as described in claim 1 wherein the outer surface of said outer ring member has a constant radius and the difference in thicknesses of said ring sections occurs on the radially inner surface of said outer ring member.

* * * * *